(12) United States Patent
Brickell et al.

(10) Patent No.: US 7,813,507 B2
(45) Date of Patent: Oct. 12, 2010

(54) METHOD AND SYSTEM FOR CREATING RANDOM CRYPTOGRAPHIC KEYS IN HARDWARE

(75) Inventors: Ernie Brickell, Portland, OR (US); Rachael Parker, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 1525 days.

(21) Appl. No.: 11/112,817

(22) Filed: Apr. 21, 2005

(65) Prior Publication Data

US 2006/0239461 A1    Oct. 26, 2006

(51) Int. Cl.
*H04L 9/00* (2006.01)
*H04K 1/00* (2006.01)

(52) U.S. Cl. .................. 380/268; 380/277; 713/181; 713/189

(58) Field of Classification Search .............. 380/268, 380/277; 713/181, 189
See application file for complete search history.

(56) References Cited

U.S. PATENT DOCUMENTS

| | | | | | |
|---|---|---|---|---|---|
| 5,222,142 | A | * | 6/1993 | Kent | 380/46 |
| 5,251,165 | A | * | 10/1993 | James, III | 708/250 |
| 5,515,307 | A | * | 5/1996 | Aiello et al. | 708/254 |
| 5,671,183 | A | * | 9/1997 | Soenen et al. | 365/189.12 |
| 6,161,213 | A | * | 12/2000 | Lofstrom | 716/4 |
| 6,185,546 | B1 | * | 2/2001 | Davis | 705/51 |
| 6,738,788 | B1 | * | 5/2004 | Horng et al. | 707/104.1 |
| 6,802,447 | B2 | * | 10/2004 | Horng | 235/375 |
| 6,888,944 | B2 | * | 5/2005 | Lotspiech et al. | 380/278 |
| 7,097,107 | B1 | * | 8/2006 | Guthery | 235/492 |
| 7,370,190 | B2 | * | 5/2008 | Calhoon et al. | 713/2 |
| 7,444,476 | B2 | * | 10/2008 | Gnanasabapathy et al. | 711/141 |
| 2003/0204743 | A1 | * | 10/2003 | Devadas et al. | 713/200 |
| 2006/0210082 | A1 | * | 9/2006 | Devadas et al. | 380/277 |

OTHER PUBLICATIONS

Lee, et al., A Technique to Build a Secret Key in Integrated Circuits for Identification and Authentication Applications, 2004, IEEE, Symposium on Vlsi Circuits Digest of Technical Papers, pp. 176-179.*

Lofstrom et al., IC Identification Circuit using Device Mismatch, 2000, IEEE, International Solid-State Circuits Conference, 2 pages.*

Gassend, et al., Controlled Physical Random Functions, 2002, IEEE, Proceedings of the 18th Annual Computer Security Applications Conference (ACSAC '02), 12 pages.*

(Continued)

*Primary Examiner*—Kambiz Zand
*Assistant Examiner*—William S Powers
(74) *Attorney, Agent, or Firm*—Blakely, Sokoloff, Taylor & Zafman LLP

(57) ABSTRACT

A method and system for creating random cryptographic keys in hardware is described. One or more bits are generated via one or more random bit circuits. Each random bit circuit includes a sensing device coupled to a first device and a second device to compare the first device against the second device and to generate a random bit from a random state value. The generated bits from the random bit circuits are read, and a cryptographic key may then be computed based on the generated bits.

16 Claims, 4 Drawing Sheets

OTHER PUBLICATIONS

Gassend et al., "Delay-Based Circuity Authentication with Application to Key Cards", Jun. 29, 2002, Laboratory for Computer Science, MIT, pp. 1-13.*

Gassend, "Physical Random Functions", Feb. 2003, Masters Thesis, MIT, pp. 1-89.*

Ranasinghe et al., "Security and privacy: Modest Proposals for Low-Cost RFID Systems", 2004, AutoID Labs Research Workshop, Zurich, Switzerland, pp. 1-7.*

* cited by examiner

METHOD AND SYSTEM FOR CREATING RANDOM CRYPTOGRAPHIC KEYS IN HARDWARE

TECHNICAL FIELD

Embodiments of the invention relate to cryptography, and more specifically to creating random cryptographic keys in hardware.

BACKGROUND

There are various methods to create cryptographic keys in hardware. The requirements are that the cryptographic key in stored in a non-volatile storage device and that each silicon chip contains a random key. The randomness ensures that if an adversary obtains keys in one or more chips, then it is infeasible for him to determine the keys in other chips. One method to create cryptographic keys in silicon is to write a random key to a non-volatile memory, such as a flash memory, during the manufacturing process. However, not all chips have flash memory. Another method is to generate a random key and use fuses that are blown to write the random key. These methods use a significant amount of chip area and there is a possibility that the keys may be read through the use of a microscope.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Embodiments of a system and method for creating random cryptographic keys in hardware are described. In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
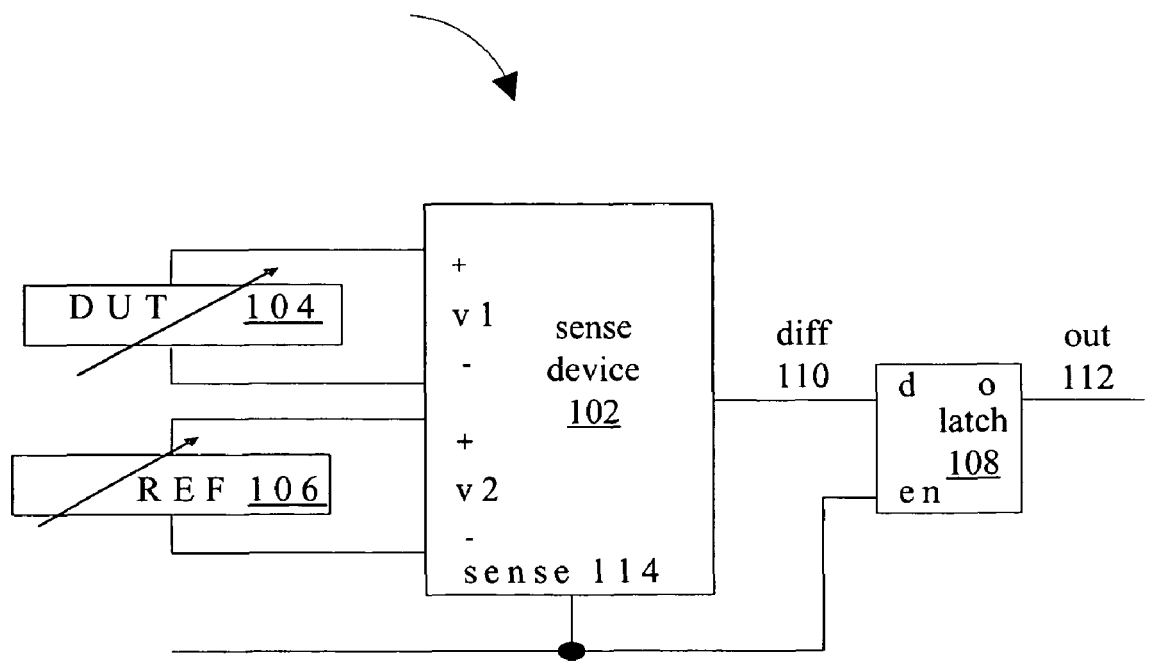
FIG. 1 is a circuit diagram illustrating an embodiment of the invention.

Referring to FIG. 1, a circuit diagram illustrates a circuit 100 according to one embodiment of the invention. Those of ordinary skill in the art will appreciate that the circuit 100 may include more components than those shown in FIG. 1. However, it is not necessary that all of these generally conventional components be shown in order to disclose an illustrative embodiment for practicing the invention.

Circuit 100 includes a sensing device 102 to compare two devices 104 and 106. The sensing device is used to generate a random state value from the naturally occurring variation of the electrical performance of a device. During the manufacturing process, variation in physical aspects that determine the device's performance, such as doping and oxide thickness result in a random distribution of electrical characteristics for identically patterned devices in sufficiently identical environments. Devices that exhibit random variation include but are not limited to resistors, diodes, and transistors. Circuit 100 may be used to convert within-die variation of a device into a random state. This random state may then be converted to a random bit value, which is stored. A number of random bit circuits, such as circuit 100, may be used to generate a plurality of random bits to create a cryptographic key.

In one embodiment, device 104 may be a diode that exhibits a random variation in its forward-bias voltage for a given current. This bias voltage may be compared to a forward-bias voltage of a similarly patterned diode 106 or a reference voltage to generate a difference voltage (V2–V1). This difference voltage may then be converted to a logic value 110 and captured by a storage element, such as latch 108. The result is a random bit output 112.

In another embodiment, device 104 may be a resistor. Its resistance may be compared to a reference resistance or the resistance of a similarly patterned resistor 106 to generate a difference resistance. The difference resistance may then be converted to a logic value 110 and captured by a storage element, such as latch 108. The result is a random bit output 112.

In yet another embodiment, device 104 may be a MOS (metal-oxide semiconductor) transistor. Its conductance may be compared to a reference conductance or the conductance of a similarly patterned transistor 106 to generate a difference conductance. Alternatively, the threshold voltages of the transistors may be compared to generate a difference voltage. The difference conductance or voltage may then be converted to a logic value 110 and captured by a storage element, such as latch 108. The result is a random bit output 112.

Figure 2:
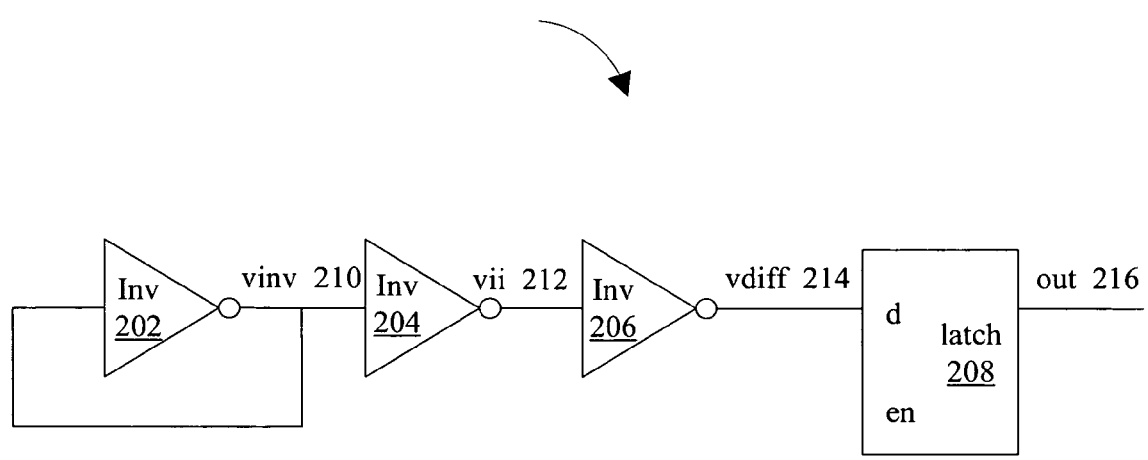
FIG. 2 is a circuit diagram illustrating an embodiment of the invention.

FIG. 2 is a circuit diagram of a circuit 200 according to an embodiment of the invention. Circuit 200 includes three inverters 202, 204, and 206. Inverter 202 has its output tied to its input to create an output voltage, vinv 210, equal to the inverter's trip point. A similarly ratioed inverter 204 is connected to the output of inverter 202 to generate a voltage vii 212. Another similarly ratioed inverter 206 is connected to the output of inverter 204. In this way, a difference voltage vdiff 214 is generated that indicates the relative mismatch between the inverter trip points. The difference voltage 214 may then be stored by latch 208. The result is a random bit output 216. The inverters used in circuit 200 may be CMOS or NMOS, single or differential, or a combination of these and other types of inverters.

Figure 3:
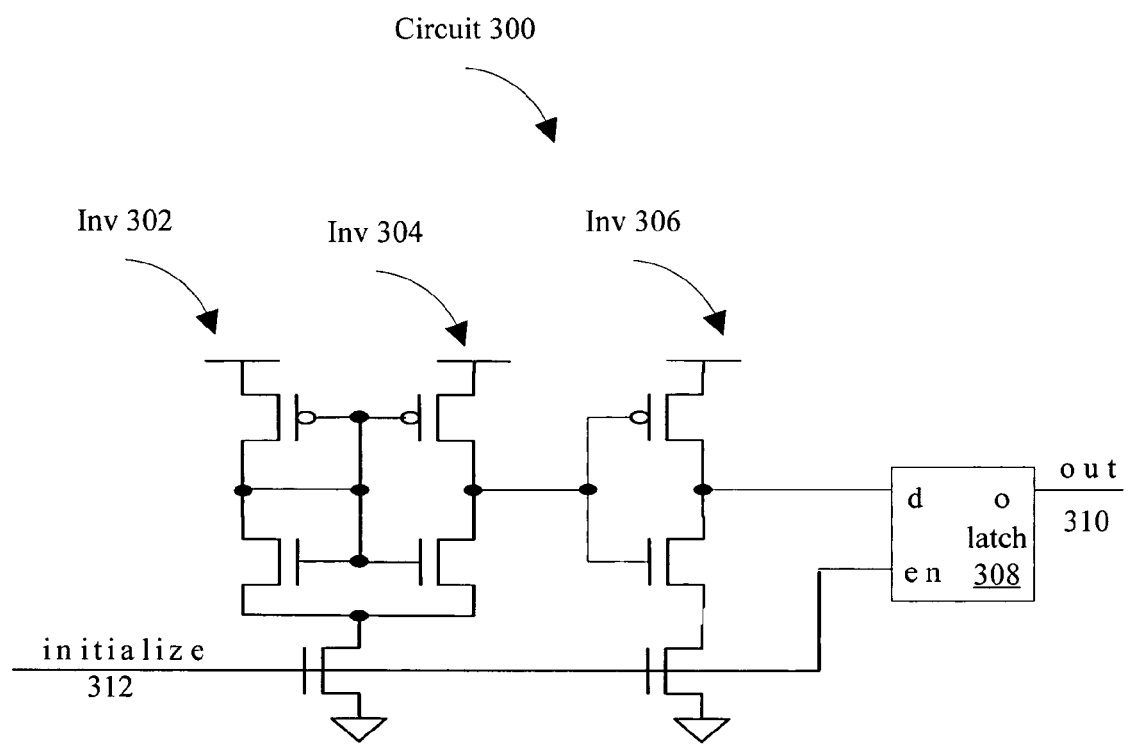
FIG. 3 is a circuit diagram illustrating an embodiment of the invention.

FIG. 3 is a circuit diagram of a circuit 300 according to an embodiment of the invention. Circuit 300 includes three inverters 302, 304, and 306. The inverters 302 and 304 are combined as a differential pair for enhanced gain. A sense enable signal, initialize 312, is added to reduce power consumption. The sense enable signal 312 may be tied to a reset or powering up signal so that the random bit value is captured by latch 308 to generate a random bit output 310 whenever the circuit powers up, but the inverters do not draw DC crowbar current thereafter.

One or more random bit circuits as described above with respect to FIGS. 1-3 may be laid out on masks. These masks may then be used to manufacture chips. Each random bit circuit creates a random bit. These bits are read on each chip. A mathematical function of the bits is stored for future use. A stored function of the bits may be used to identify the chip. A stored function of the bits may be used to send secret information to the chip. This process is described in further detail with respect to FIG. 4.

Figure 4:
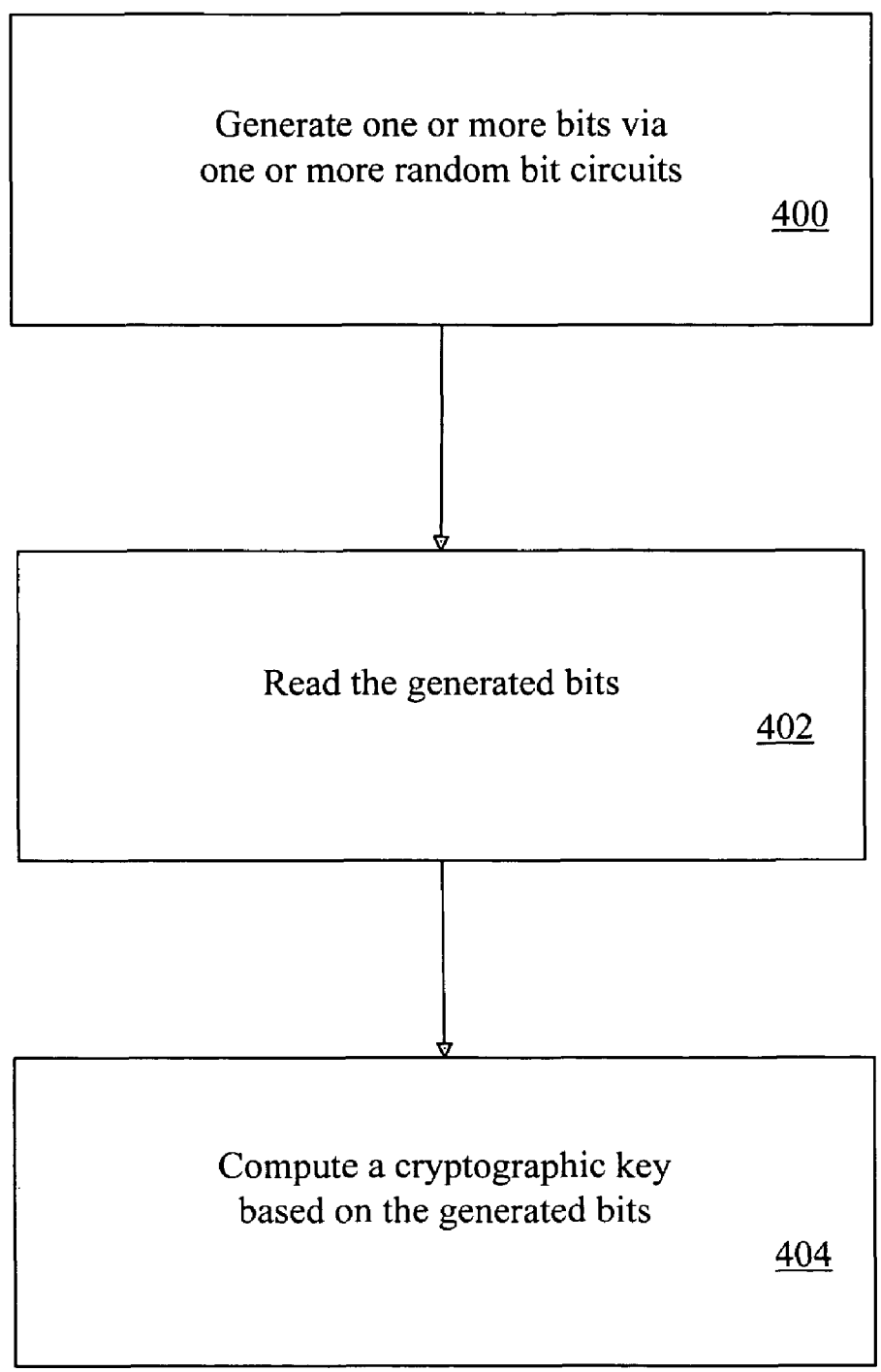
FIG. 4 is a flow diagram illustrating a method according to an embodiment of the invention.

FIG. 4 illustrates a method according to one embodiment of the invention. At 400, one or more bits are generated via one or more random bit circuits, such as those described above with respect to FIGS. 1-3. At 402, the generated bits are read. At 404, a cryptographic key is computed based on the generated bits. 400-404 may be generated by circuitry within the chip containing the random bit circuits.

In one embodiment, an error correcting code is used to correct small inconsistencies in the reading of the random bit circuits. Examples of error correcting codes that may be used include a Reed-Solomon code, a Bose-Chaudhuri-Hochquenghem (BCH) code, or a Hamming code. The codeword that is closest to the generated bits is found.

In one embodiment, the generated bits may be separated into blocks, and an error correcting code may be used to correct small inconsistencies within each block. In this case, for each block, a block codeword is found that is closest to the generated bits in that block. The closest codeword for all the generated bits is then determined as the combination of the closest block codeword for each of the blocks.

After the closest codeword is determined, an offset may be computed based on the difference between the generated bits and the closest codeword. A cryptographic keypair may also be computed based on the closest codeword. The cryptographic keypair includes a public key and a private key. The chip may then output the public key and offset. The public key and offset are stored. A certificate may be issued for the public key. In the field, the circuit is powered up. The generated bits are read and recorded in one or more registers. The offset is input and added to the registers. A correction is made to the closest codeword using the error correcting code. The cryptographic keypair is computed using this codeword. The private key is stored in a register. The public key may be checked against the stored public key to verify that the correct code word was calculated. The private key and certificate can then be used in a cryptographic protocol, such as digital signatures or encryption.

In another embodiment, a hash of the generated random bits is computed to generate an identification number. The hash may be generated using a cryptographic hash function, such as Secure Hash Algorithm SHA-1 or SHA-256. The generated bits are also used to generate a cryptographic key pair. The public key can be output, and a certificate produced for the public key. This identification number may then be outputted and stored in the manufacturer's server. In the field, the circuit is powered up and the generated bits are read. A hash of the generated bits is computed and compared to a list of identification numbers to see if the computed identification number is on the list. If it is not, then changes to one or more of the generated random bits may be made and a hash computed again. This hash is then compared to a list of identification numbers. This process continues until the hash matches one of the identification numbers on this list. When a match occurs, then the cryptographic key pair is computed from the generated bits with the changes required to make the hash match. The private key, which is kept secret in the chip, and the certificate may then be used in cryptographic protocols. The matched identification number and the changes needed to create a match may be stored and input back into the chip the next time it powers up to speed up the process of finding the matching hash.

In yet another embodiment, the random bit circuits could be used to produce a ChipID to identify each chip. During manufacturing, the ChipID would be read and stored. When the chip needs to be identified, the ChipID may be read and sent to the manufacturer. The manufacturer could then identify the device by doing a search of its database for the ID that is closest to the one received.

As will be appreciated by those skilled in the art, the content for implementing an embodiment of the method of the invention, for example, computer program instructions, may be provided by any machine-readable media which can store data that is accessible by circuit 100, as part of or in addition to memory, including but not limited to cartridges, magnetic cassettes, digital video disks, random access memories (RAMs), read-only memories (ROMs), flash memories, and the like. In this regard, the circuit 100 is equipped to communicate with such machine-readable media in a manner well-known in the art. It will be further appreciated by those skilled in the art that the content for implementing an embodiment of the method of the invention may be provided to the circuit 100 from any external device capable of storing the content and communicating the content to the circuit 100.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   comparing at power up a voltage or a current of a random bit device with a corresponding reference voltage or a reference current, wherein the random bit device exhibits random process variations;
   generating one or more bits based on the comparing;
   storing the generated one or more bits; and
   computing a cryptographic key based on the stored bits.

2. The method of claim 1, further comprising finding a codeword among a predetermined set of codewords that is a closest match to the generated one or more bits.

3. The method of claim 2, further comprising computing an offset between the generated one or more bits and the closest match codeword.

4. The method of claim 3, further comprising creating a cryptographic key pair including the computed offset and the cryptographic key.

5. The method of claim 2, further comprising applying the closest match codeword as a parameter in a cryptographic protocol.

6. The method of claim 2, wherein computing a cryptographic key based on the stored bits comprises computing a cryptographic key pair based on the closest match codeword, the cryptographic key pair including a public key and a private key.

7. The method of claim 6, further comprising outputting the public key.

8. The method of claim 1, wherein computing a cryptographic key based on the generated bits comprises matching a hash of the generated bits to a list of identification numbers.

9. An apparatus comprising:
a first device exhibiting random process variations;
a second device to be referenced against the first device;
a sensing device, coupled with the first device and the second device, to compare the first device against the second device at power up;
a storage device to generate a random state value based on the comparison between the first device and the second device; and
a logic to generate a random bit from the random state value.

10. The apparatus of claim 9, further comprising a latch to store the generated random bit.

11. The apparatus of claim 9, wherein the sensing device is a sense amplifier.

12. The apparatus of claim 9, wherein the first device is a MOS (metal-oxide semiconductor) transistor.

13. The apparatus of claim 12, wherein the random state value is a conductance of a MOS transistor.

14. A system comprising:
a flash memory; and
a random bit circuit coupled with the flash memory, the random bit circuit including:
a first device exhibiting random process variations;
a second device to be referenced against the first device;
a sensing device, coupled with the first device and the second device, to compare the first device against the second device at power up;
a storage device to generate a random state value based on the comparison between the first device and the second device; and
a logic to generate a random bit from the random state value.

15. The system of claim 14, wherein the random bit circuit further comprises a latch to store the generated random bit.

16. The system of claim 14, further comprising another random bit circuit coupled with the flash memory to generate another random bit, wherein the generated random bits are combined to create a cryptographic key.

\* \* \* \* \*